US007589431B2

(12) United States Patent
Hentsch et al.

(10) Patent No.: US 7,589,431 B2
(45) Date of Patent: Sep. 15, 2009

(54) MOTOR VEHICLE DOOR LOCK SYSTEM

(75) Inventors: Ingmar Hentsch, Wuppertal (DE); Michael Langfermann, Wuppertal (DE); Christian Groewe, Wuppertal (DE); Frank Hegerfeld, Gelsenkirchen (DE); Klaus Duenne, Heiligenhaus (DE); Andreas Platzkoester, Wuppertal (DE)

(73) Assignee: Brose Schliesssysteme GmbH & Co., KG, Wuppertal (DE)

( * ) Notice: Subject to any disclaimer, the term of this patent is extended or adjusted under 35 U.S.C. 154(b) by 319 days.

(21) Appl. No.: 11/014,903

(22) Filed: Dec. 20, 2004

(65) Prior Publication Data

US 2005/0156468 A1 Jul. 21, 2005

(30) Foreign Application Priority Data

Dec. 19, 2003 (DE) ................................ 103 60 422

(51) Int. Cl.
*B60L 1/00* (2006.01)

(52) U.S. Cl. ...................................................... 307/10.1

(58) Field of Classification Search ................ 307/10.1; 710/45; 180/271; 280/735; 340/933, 438
See application file for complete search history.

(56) References Cited

U.S. PATENT DOCUMENTS

| | | | | |
|---|---|---|---|---|
| 5,260,877 | A * | 11/1993 | Drobny et al. | 701/114 |
| 5,764,063 | A * | 6/1998 | Katou et al. | 324/434 |
| 5,901,991 | A | 5/1999 | Hugel et al. | |
| 5,912,631 | A * | 6/1999 | Kusunoki | 340/5.64 |
| 6,161,070 | A * | 12/2000 | Jinno et al. | 701/45 |
| 6,388,221 | B1 * | 5/2002 | Rudolph et al. | 200/556 |
| 6,388,410 | B1 * | 5/2002 | Hohn | 318/445 |
| 6,515,377 | B1 * | 2/2003 | Ubelein et al. | 307/10.1 |
| 7,064,456 | B2 * | 6/2006 | Hirota et al. | 307/10.1 |
| 2001/0054846 | A1 * | 12/2001 | Boezen et al. | 307/10.1 |
| 2002/0109405 | A1 * | 8/2002 | Bender et al. | 307/10.1 |
| 2002/0163429 | A1 * | 11/2002 | Otterbach et al. | 340/517 |
| 2003/0101781 | A1 * | 6/2003 | Budzynski et al. | 70/239 |
| 2003/0111863 | A1 * | 6/2003 | Weyerstall et al. | 296/146.1 |
| 2003/0184098 | A1 * | 10/2003 | Aiyama et al. | 292/216 |
| 2003/0226703 | A1 * | 12/2003 | Amemiya | 180/270 |
| 2004/0070489 | A1 * | 4/2004 | Ueda et al. | 340/5.61 |
| 2004/0217649 | A1 * | 11/2004 | Rouleau | 307/10.1 |
| 2005/0040709 | A1 * | 2/2005 | Enders et al. | 307/10.1 |

* cited by examiner

*Primary Examiner*—Albert W Paladini
*Assistant Examiner*—Daniel Cavallari
(74) *Attorney, Agent, or Firm*—David S. Safran; Roberts Mlotkowski Safran & Cole, P.C.

(57) ABSTRACT

A motor vehicle with a control means and an electrically connected sensor. The sensor is used especially to detect the actuation of a door handle for opening a motor vehicle lock. In order to ensure high failure safety, the sensor for transmission of sensor signals has at least two electrically independent outputs which are connected to the control means via electrical signal lines.

28 Claims, 5 Drawing Sheets

MOTOR VEHICLE DOOR LOCK SYSTEM

BACKGROUND OF THE INVENTION

1. Filed of Invention

This invention relates to a motor vehicle with a control means and with at least one sensor which is electrically connected to the control means.

2. Description of Related Art

German Patent Application DE 196 32 915 A1, which corresponds to U.S. Pat. No. 5,901,991, forms the starting point of this invention and discloses a motor vehicle locking system of a motor vehicle. The motor vehicle locking system has a control means and a motor vehicle lock. The motor vehicle lock is made as a so-called electric lock in which a ratchet for opening the latch of the motor vehicle lock can be lifted by means of an electrical drive. A microswitch which is necessarily made as a double throw momentary contact switch and which is connected to the control means is assigned to the ratchet as the sensor for detecting the state of the ratchet.

Furthermore, the known motor vehicle locking system has a handle, especially an outside door handle. A microswitch which is necessarily made as a double throw momentary contact switch and which is connected to the control means is assigned to the handle as the sensor for detecting actuation.

In the known motor vehicle locking system, there is the risk that the connection which is conventionally formed by cables between the sensor and the control means can be interrupted or short circuited, for example, as a result of a cable break, accident or the like. This would lead to immediate failure of the sensor and thus to a safety risk since, for example, the motor vehicle door can no longer be opened.

At the same time, there is the danger of a malfunction of the sensor or the control means which, in the worst case, can lead to unwanted motorized lifting of the ratchet and thus opening of the motor vehicle door while driving. This malfunction can be caused, for example, by electromagnetic interference fields or by a crash situation. For an at least partially software-implemented control means, then, possibly errors in the input/output registers or unforeseeable jumps in the program execution with the corresponding unforeseeable consequences occur.

SUMMARY OF THE INVENTION

A primary object of this invention is to devise a motor vehicle with increased safety against failure or malfunction, especially against interruption of the electrical connection between the sensor and the control means for transmission of sensor signals to the control means. Therefore, on the one hand, the detection of a failure or malfunction, and on the other hand, ensuring the desired function in spite of failure or malfunction are of interest.

The aforementioned object is achieved, first of all, by a motor vehicle, wherein the sensor has two electrically independent outputs for transmission of sensor signals and wherein the outputs are connected to the control means via electrical signal lines.

The basic idea of this invention is to provide a sensor—especially in a motor vehicle locking system—for transmission of sensor signals with two electrically independent outputs and to connect the outputs to the control means via electrical signal lines. Thus, first of all, it is fundamentally possible to detect an error state by the control means. If, for example, sensor signals are transmitted to the control means via the outputs of the sensor which are not compatible to one another, this can be detected by the control means. The sensor signals of a sensor are compatible in this sense when they are in an "allowed" relationship to one another which is predetermined for the normal case; in the simplest case, the sensor at its outputs delivers identical sensor signals, so that deviation of the sensor signals from one another is a reliable indication of the malfunction of the sensor.

The approach in accordance with the invention, furthermore, makes it possible that, even when a signal line fails, the sensor signal can continue to be transmitted via another signal line to the control means and can be evaluated by it. The approach of the invention therefore allows not only detection of the failure or malfunction, but itself ensures proper operation even when a failure or a malfunction occurs.

In one preferred embodiment, the sensor is assigned to a control element, such as a door handle, a handle, a control lever or the like on the motor vehicle door in order to detect actuation of the control element and based on the respective sensor signals, optionally, to induce opening of an assigned motor vehicle lock. The electrical connection between the door-side sensor and the control means which is conventionally located centrally in the motor vehicle or on the body side for detection and evaluation of the sensor signals can be interrupted, for example, by chafing of the cable or the like. This interruption can be detected by the approach in accordance with the invention, and thus, the operating reliability of the motor vehicle locking system or of the motor vehicle overall can be increased.

The sensor can also, optionally, be assigned to the motor vehicle door lock itself or can be located in it. Here, the approach according to the invention can, in turn, among others, also prevent interruption of the transmission of sensor signals, and thus, increase the operating reliability of the motor vehicle locking system or of the motor vehicle overall.

Preferably, two separate current paths for the sensor signals are formed. In particular, the sensor has two electrically independent inputs for this which are coupled or connected to the outputs, for example, by switching and are connected to the power supply via separate supply lines. Thus, an especially high level of safety against failure of transmission of the sensor signals to the control means is achieved.

In an especially preferred embodiment, the sensor has two sensor modules for producing sensor signals, the sensor modules preferably operating according to different sensor action principles. The advantage of this configuration of the sensor is that the two sensor modules are made differently such that they react to certain interference effects differently or in any case to some extent not at all. Thus, the probability can be minimized that, when a certain interference effect occurs, the two sensors simultaneously malfunction. This increases altogether the operating reliability even under unfavorable ambient conditions.

According to another teaching which acquires independent importance, the above described concept of increasing the safety by redundancy is expanded to the control means. What is important here is the parallel evaluation of the signals produced by the sensor such that a failure or malfunction can be easily detected by the control means by evaluation results which are incompatible or which deviate from one another. For this reason, the control means has a first evaluation unit and another second evaluation unit which is independent of the first evaluation unit, the control means evaluating the sensor signals produced by the sensor essentially in parallel by the two evaluation units, and based on this evaluation, delivering control signals to a consumer, such as, for example, the electrical drive of a ratchet—opening drive.

The evaluation units each take over for themselves the original function of a conventional control, specifically "reading-in" of sensor signals, generation of an evaluation signal which is assigned to the respective sensor signal, and output of the evaluation signal. In the approach of the invention, in any case, there are two evaluation signals which could be identical or different depending on the configuration of the evaluation units. Accordingly, the control means can optionally be equipped with other components in order to determine whether the evaluation signals are compatible with one another or whether there is a malfunction, for example, of one of the two evaluation units.

The above described concept of a redundant control means can be combined especially advantageously with the concept of redundant design or coupling of the sensor which was described further above. In this way, an especially high safety level is achieved as a result.

A high level of safety can be achieved especially when the two evaluation units are made largely independent of one another. In an at least partially software-implemented control means, this can be supported by the fact that different storage areas of a microcontroller or the like are assigned to the two evaluation units in any case. However, it is optimum if the two evaluation units each are made at least in part in separate hardware.

According to two other independent teachings which likewise each acquire independent importance, the above concepts are applied to the motor vehicle locking system of the above described motor vehicle.

Other advantages, features, properties and aspects of this invention will become apparent from the following description of preferred embodiments with reference to the accompanying drawings.

DETAILED DESCRIPTION OF THE INVENTION

In the figures, for the same or different parts the same reference numbers are used, the corresponding or comparable properties and advantages being achieved, even if a repeated description is omitted.

Figure 1:
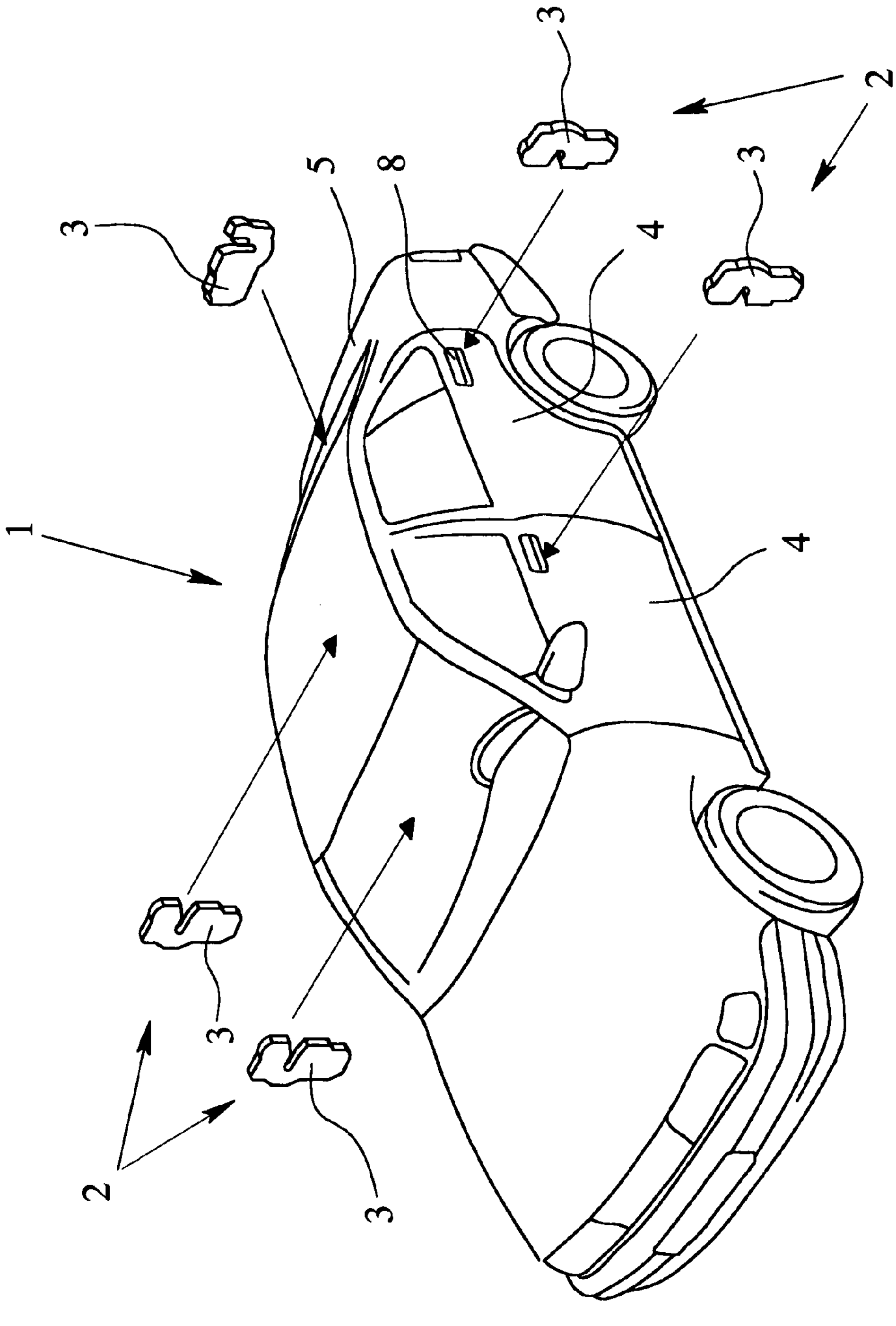
FIG. 1 shows a schematic of a motor vehicle in accordance with the invention with a motor vehicle locking system.

FIG. 1 schematically shows a motor vehicle 1 with a motor vehicle locking system 2, which is shown only partially. It has especially several motor vehicle locks 3, especially for side doors 4 and/or a trunk lid 5, a rear hatch, a tailgate or the like.

The expression "motor vehicle lock" is therefore defined primarily as a door lock. However, it can be a trunk lock, a hood lock, a hatch lock or the like of the motor vehicle 1.

In the illustrated embodiment, the installation positions of the motor vehicle locks 3 are shown schematically by the arrows in FIG. 1.

Each motor vehicle lock 3—at least of the side doors 4—can be electrically controlled, preferably, so as to be actuated by a motor, and especially can be locked and unlocked by an electric motor and/or can be opened by an electric motor, especially made as a so-called electric lock. For example, for opening, the lifting of a ratchet (not shown) takes place by means of an opening drive, especially an electric motor (not shown).

Figure 2:
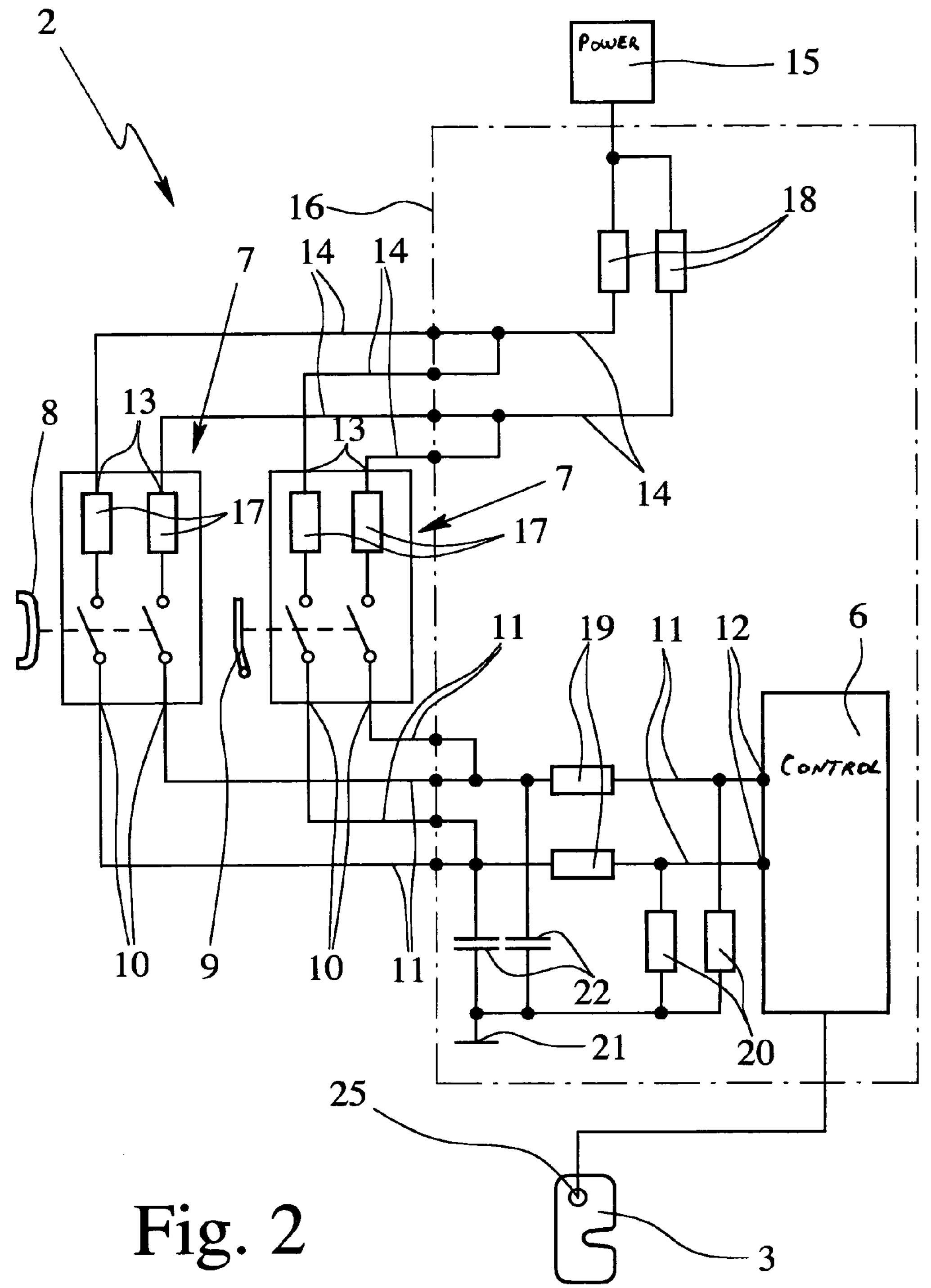
FIG. 2 shows a schematic circuit diagram of the motor vehicle locking system of a motor vehicle in accordance with the invention.

FIG. 2 shows a schematic block diagram of the motor vehicle locking system 2 in accordance with the invention with a motor vehicle lock 3, a control means 6 and at least one sensor 7 which is electrically connected to the control means 6. In the illustrated embodiment, at least two sensors 7 are connected to the control means 6, the sensors 7 being used to detect actuation of a control element, such as a door handle 8 or an actuating lever 9.

Preferably one sensor 7 is assigned to an outside door handle 8 and the other sensor 7 is assigned to an inside actuating lever 9 or the like of a side door 4 of the motor vehicle 1 (not shown in FIG. 2) for detection of the respective actuation.

The concept "actuation of the control element" in a narrower sense is defined here as a mechanical action or motion or actuation taking place. In a further sense, however, this is also defined as contact and/or approach, especially of the hand of an operator or passenger (not shown), especially in order to effect locking, unlocking or opening of the assigned motor vehicle lock 3. The sensors 7 are, if necessary, made accordingly in order to detect this type of actuation and to output a corresponding sensor signal.

When a control element, such as a door handle 8 or the actuating lever 9, is actuated, a corresponding sensor signal is detected by the control means 6 which then—as in the illustrated embodiment—can trigger the motor vehicle lock 3 for opening, unlocking, or locking directly or via some other central control (not shown). The control can accordingly be made as a switch, button, movable handle, inside door handle, outside door handle, or the like. For example, the control element can comprise a rocker (not shown) located on the door handle 8 and which can be actuated for unlocking, locking and/or especially opening of the assigned motor vehicle lock 3, especially by the hand of an operator or passenger.

The sensor 7, for transmission of sensor signals, has two electrically independent outputs 10, the outputs 10 being connected via electrical signal lines 11 to the control means 6.

With a corresponding configuration of the sensor 7, the outputs 10 of the sensor 7 can be connected to the control means 6 via a common electrical signal line. In the preferred embodiment, which is shown in FIG. 2, it is certainly such that the outputs 10 of the sensor 7 are connected to the control means 6 via separate electrical signal lines 11. This is advantageous in any case with respect to a possible cable break.

The control means 6 is coupled to a consumer 25 for its triggering. For this purpose, the control means 6 delivers control signals to the consumer 25. In one especially preferred embodiment, the consumer 25 is made as the drive of a motor vehicle lock 3, preferably, as the above described opening drive of a motor vehicle lock 3.

One embodiment which can be implemented especially easily calls for the sensor signals which are at the different outputs 10 of the sensor 7 to be identical to one another. Then, it is preferably such that the sensor 7 has two electrically independent outputs 10 for the same—identical—sensor signal and the outputs 10 are connected to two separate inputs 12 of the control means 6 via two separate electrical signal lines 11.

For the case in which the outputs 10 of the sensor 7 are connected to the control means 6 via separate electrical signal lines 11, when one signal line 11 fails, the respective sensor signal can be transmitted to the control means 6 via another signal line 11 and can be evaluated by it. Furthermore, it is possible that, by the control means 6, a faulty sensor signal can be detected by comparison of the sensor signals which have been transmitted over the signal lines 11. This is, for example, the case when the sensor signals produced by the sensor 7 are not compatible with one another.

Accordingly, in the approach of the invention, much greater safety against malfunction of the sensor 7 and against unwanted interruption of the transmission of sensor signals to the control means 6, and thus, overall, greatly increased operating reliability of the motor vehicle locking system 2 or of the motor vehicle 1 arise.

The sensor 7—especially when made as a double switch—has at least two, preferably exactly two electrically independent inputs 13 which are connected to the power supply 15 via separate supply lines 14. There are two electrically independent current paths for the sensor signals, at least between body-side evaluation electronics 16 with the control means 6 and the door-side sensor 7 via the lines 11, 14.

The lines 11, 14 are preferably combined into a connecting cable or the like (not shown). In particular, the connecting cable is made flexible enough to ensure for example, a transition from the preferably body-side control means 6 and the evaluation electronics 16 to the movable door 4 with the sensor 7, and preferably, the motor vehicle lock 3. Preferably, the connecting cable then, optionally, comprises other lines for control or power supply of the motor vehicle lock 3, of a window raiser or the like (not shown).

The two sensors 7 are preferably built at least essentially the same or identically, so that only the structure of one sensor 7 is explained below.

The sensor 7 is made preferably switching, especially as a double switch or multi-circuit switch. One especially preferred embodiment calls for the sensor 7 for producing the sensor signals to have at least two switching devices in parallel, preferably at least one of the switching devices being made as a make contact and another of the switching devices being made as a break contact. In this way, for example, a short-circuit between the separate signal lines 11 can be easily detected.

The configuration of the sensor 7 is especially easy and economical as a microswitch with two independent switching lugs. The microswitch then, as above, preferably, has two switching devices which are independent of one another.

The sensor 7 can, optionally, also output analog or digital sensor signals, and therefore, optionally, can be made not only as a switch; in particular, in this case, the sensor 7 can also be made from an electronic circuit with two separate outputs 10 which can then be supplied with current, optionally, via only one common connection.

Alternatively or in addition, the sensor 7 can work capacitively, inductively, optically and/or piezoelectrically. In particular, the sensor 7 can also be formed by two optionally electrically independent sensor elements, for example, piezo-elements or the like which especially form a unit. In a consistent development of this idea, an especially reliable arrangement can be achieved quite generally in that the sensor 7 for producing the sensor signals (as shown in FIGS. 3*a* & 3*b*) has at least two sensor modules 7*a*, 7*b*, the sensor modules 7*a*, 7*b*, preferably, each operating according to different sensor action principles.

Figure 3:
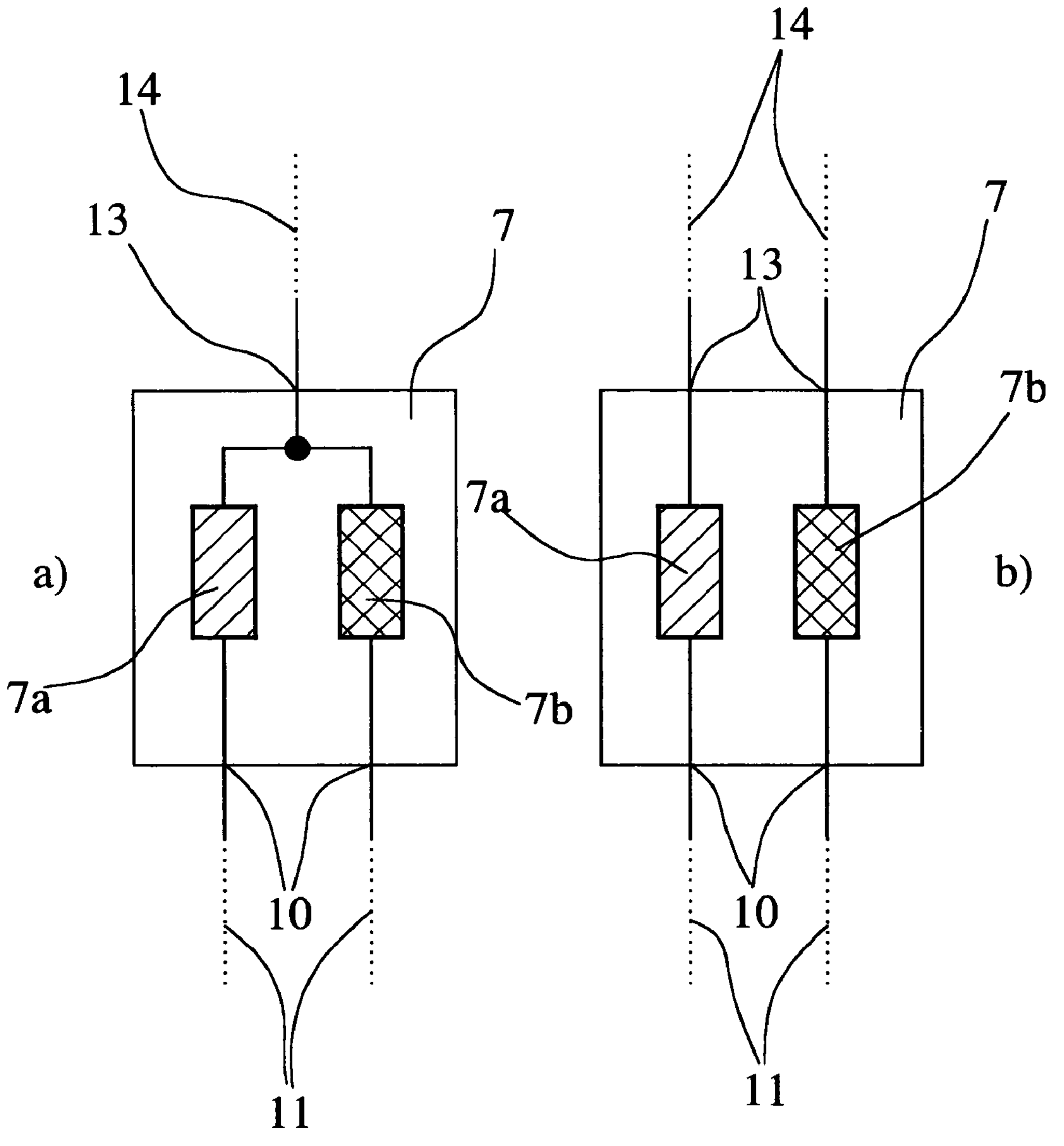
FIGS. 3*a* & 3*b* are schematic illustrations of first and second embodiments of a sensor of the motor vehicle locking system as shown in FIG. 2, respectively.

According to the aforementioned description, the sensor modules 7*a*, 7*b* can each operate capacitively, inductively, optically and/or piezoelectrically. If, at this point, for example, a capacitive sensor module 7*a* is combined with an optical sensor module 7*b* into a sensor 7, a high electromagnetic noise field, in any case, has effects on the capacitive sensor module 7*a*, while the optical sensor module 7*b* is not influenced by it. The sensor 7 remains serviceable as a result. This leads, as described above, to high operating reliability. FIG. 3 schematically shows the configuration of the sensor 7 with two sensor modules 7*a*, 7*b*. Here, it can be provided that the sensor 7 has only a single input 13 for connection of a single supply line 14 (FIG. 3*a*) or that the sensor 7 has two electrically independent inputs 13 which are connected via separate supply lines 14 (FIG. 3*b*).

Preferably, the sensor 7 or its sensor signal can be distinguished by resistor coding or in some other way. In the illustrated embodiment, a resistor 17 is assigned to the sensor 7 or to each formed current path and proceeding from the power supply 15 form a voltage divider together with the input-side and/or output-side resistors 18, 19 and 20 which are series connected when the sensor 7 is switched through between the power supply 15 and an opposite potential, especially the ground 21.

The control means 6 and its inputs 12 in the illustrated embodiment are connected between the resistors 19 and 20 to the current paths, therefore parallel to the resistors 20. Accordingly, the sensor signals and their voltages which can be detected by the control means 6 are dependent, among others, on the resistor or resistors 17 of the sensor 7, and thus, are “resistor-coded”.

When the signal line 11 and/or a supply line 14 fails, the control means 6 can receive and evaluate a sensor signal furthermore from the sensor 7 via the other current path or other signal line 14. The function of the motor vehicle locking system 2 or of the motor vehicle 1 is accordingly not adversely affected. Furthermore, the control means 6 can ascertain, based on resistor coding or voltage division, whether, and optionally where, a line interruption or a short circuit is present. This enables simple error detection.

Furthermore, in the illustrated example, it is preferably provided that, in addition, the second sensor 7 is connected to the same inputs 12 of the control means 6 via separate or optionally common signal lines 11. In particular, the two sensors 7 with their two current paths are each connected in parallel for their sensor signals.

The sensor signals are then differentiated, preferably, by different resistor coding or signal voltages. In particular, the resistors 17 of one sensor 7 differ in their values from those of the resistors 17 of the other sensor 7. Preferably, therefore, the sensor signals 7 which can be detected by the control means 6 differ in the level of their voltage, depending on from which sensor 7 they originate. The sensor signals 7 can be distinguished accordingly.

In this embodiment, the two sensors 7 are connected to the control means 6. This corresponds to the preferred embodiment of the assignment of the two sensors 7 to an inside door handle, on the one hand, and an outside door handle, on the other hand. Basically, resistor coding or another type of coding also makes it possible to connect several sensors 7 to the two inputs 12 of the control means 6. Moreover, of course, several groups of sensors can also be connected to several groups of inputs of the control means.

The indicated parallel connection of the sensors 7 has the advantage that additional inputs 12 on the control means 6 are not necessary. In particular, the cabling cost or circuit cost, and thus, also the fault susceptibility, can be reduced.

The control means 6 is preferably formed by an integrated circuit or a so-called microcontroller with the corresponding ports for the inputs 12.

The capacitors 22 indicated in FIG. 2 are used as filters to discharge unwanted interference or the like.

The evaluation electronics 16 preferably forms a unit which is located, as explained above, on the body side or centrally on or in the motor vehicle 1.

In this embodiment, the control means 6 and the evaluation electronics 16 are assigned to only one motor vehicle door 4 with the two sensors 7. However, the sensors 7 of several motor vehicle doors 4 can also be connected to the same control means 6 or evaluation electronics 16, especially when the individual sensors 7 are "resistor-coded" differently and/or the means 6 has a corresponding number of inputs 12, especially for paired connection of sensors 7.

Accordingly, if necessary, also several motor vehicle locks 3 can be connected directly or indirectly to the control means 6 and the evaluation electronics 16.

Figure 4:
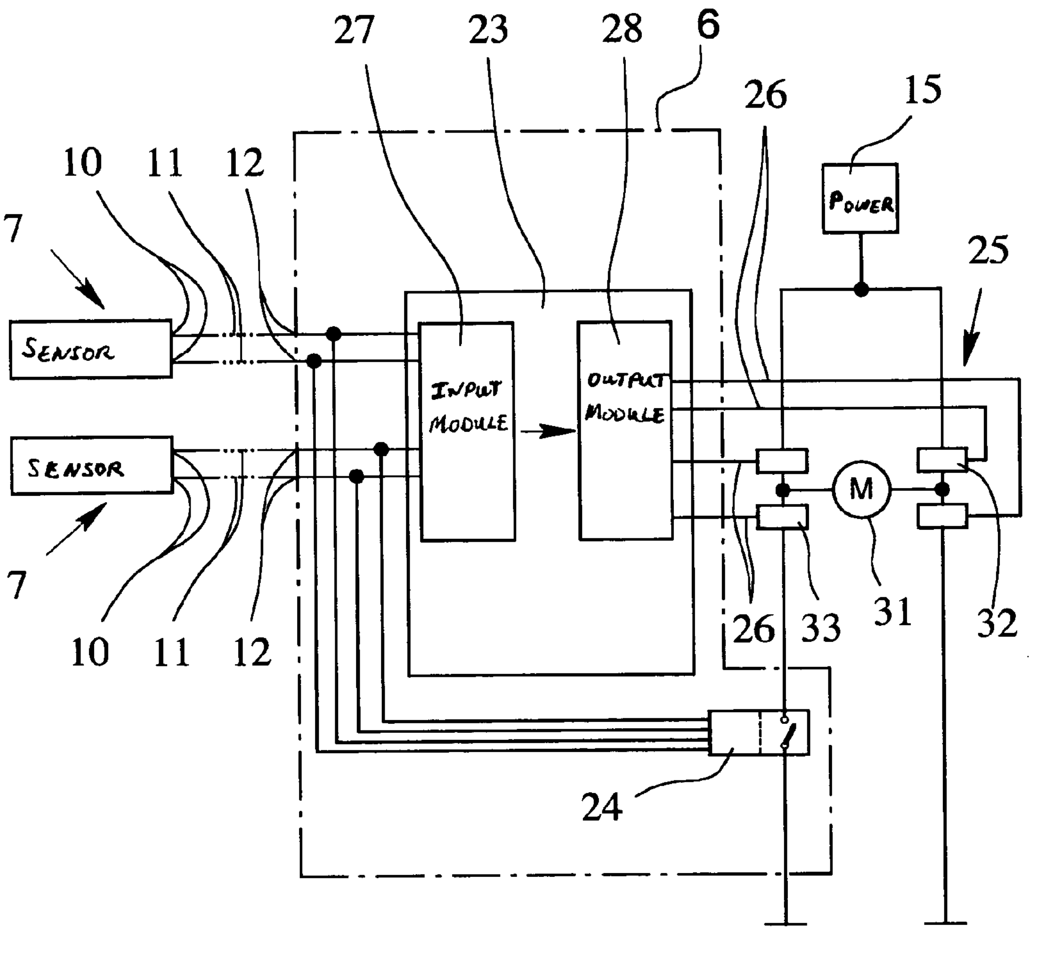
FIG. 4 shows a schematic diagram of the motor vehicle locking system of a second motor vehicle in accordance with the invention.
Figure 5:
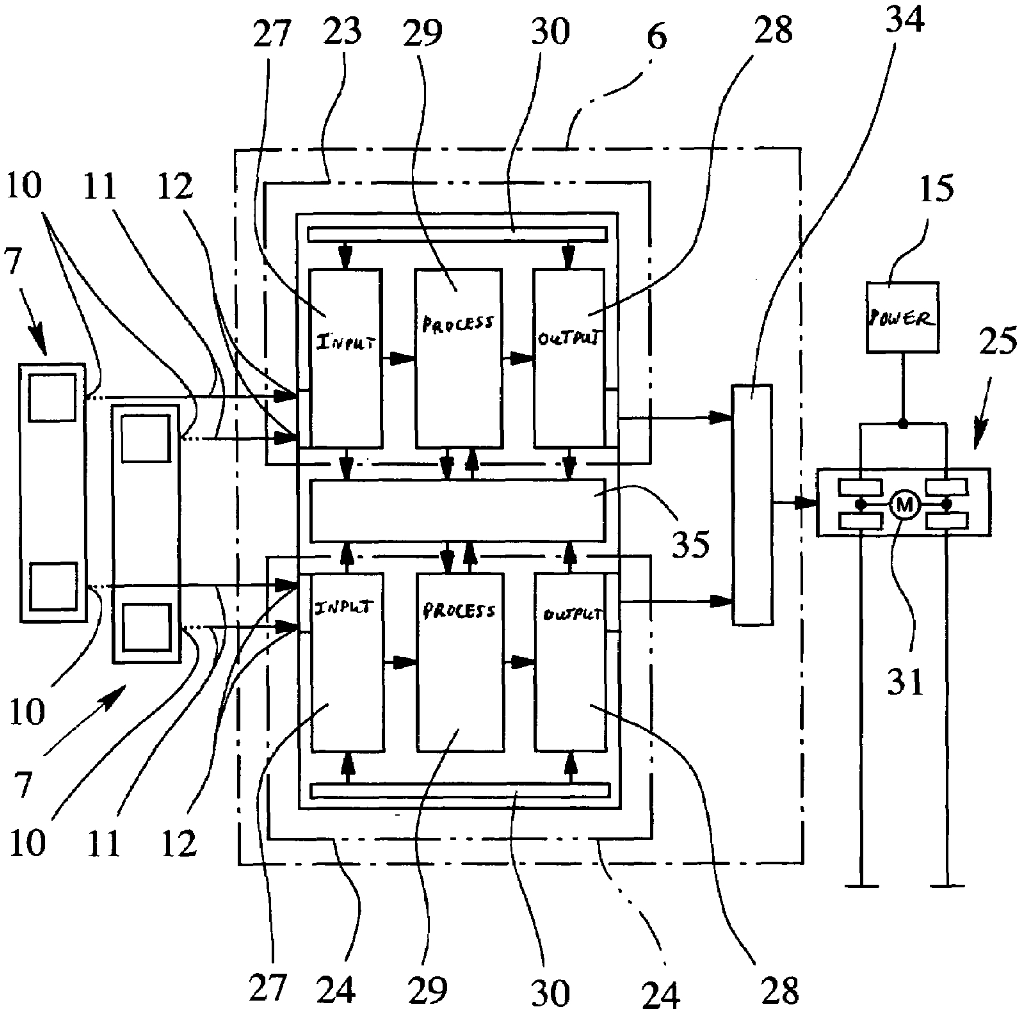
FIG. 5 shows a schematic diagram of the motor vehicle locking system of a third motor vehicle in accordance with the invention.

According to another aspect of the invention, which likewise acquires independent importance, in addition to the above described redundant design and coupling of the sensor 7, a redundant configuration of the control means 6 is contemplated. Two preferred embodiments for such a redundant control means 6 are shown by FIGS. 4 & 5. The statements above apply to these other embodiments accordingly.

Two sensors 7 are connected to the control means 6 which is shown in FIG. 4 and are used as above, preferably, for detection of the actuation of a control element, such as a door handle 8 or an actuating lever 9. The corresponding arrangement is shown in FIG. 5. An optionally present power supply for the sensors 7 is not shown here.

It is important at this point for the control means 6 to have at least one first evaluation unit 23 and another second evaluation unit 24 which is independent of the first evaluation unit 23, the control means 6 evaluating the sensor signals which have been produced by the sensors 7 essentially in parallel by the two evaluation units 23, 24, and based on this evaluation, delivering control signals to a consumer 25. The triggering of the consumer 25 by the control means 6 is explained below.

FIGS. 4, 5 show that the control means 6 is coupled to the consumer 25 for its triggering, in FIG. 4 via the control lines 26. The consumer 25 is, as already indicated, preferably made as a drive of a motor vehicle lock 3, especially as the opening drive of a motor vehicle lock 3.

Similarly to the sensors 7 shown in FIG. 2, the sensors 7 shown in FIGS. 4, 5, for transmission of sensor signals, each have two electrically independent outputs 10 which are connected via two separate electrical signal lines 11 to two separate inputs 12 of the control means 6. The described advantages can be achieved by this redundant design or coupling of the sensors 7. Reference should be made to the statements above. However, it is also fundamentally possible to connect each of the sensors 7 here via only one signal line to the control means 6.

The connection of the sensors 7 is shown by the broken line in FIGS. 4, 5 in order to indicate that the aforementioned resistor coding can also be provided here.

In the embodiment shown in FIG. 4, it is such that, for evaluation of the sensor signals, the two outputs 10 of the sensor 7 are assigned to the two evaluation units 23, 24 respectively. This is advantageous in that a cable break with the corresponding design can be detected by the respective evaluation unit 23, 24.

The embodiment shown in FIG. 5 follows another concept. Here, for evaluating the sensor signals, one output 10 of the sensor 7 is assigned to one evaluation unit 23 and the other output 10 of the sensor 7 is assigned to the other evaluation unit 24. A cable break here leads to only one of thee evaluation units 23, 24 being able to react to the actuation, for example, of the outside door handle. As a result, the two evaluation units 23, 24 will generate evaluation signals which do not agree or which are not compatible, by which a cable break can be detected in turn by the control means 6.

For implementation of the control means 6, a series of possibilities exist. Basically, the control means 6 can be made as hardware and "hard-wired." This is an especially reliable version, but is inflexible, complex and expensive.

It is more favorable to equip the control means 6 with at least one microcontroller or the like on which control software can run. This was indicated above. The concept of "microcontroller" here comprises all programmable electronic components and combinations of these programmable components. The programmability of microcontrollers ensures maximum flexibility with minimum hardware costs.

In the implementation of the control means 6 with a microcontroller, the two evaluation units 23, 24 are each implemented, at least in part, using software. In order to ensure the independence of the two evaluation units 23, 24, it is provided here that different storage areas of the microcontroller be assigned to the two evaluation units 23, 24.

In the embodiments shown in FIGS. 4, 5, the evaluation units 23, 24 are each equipped with an input module 27 for connection of the sensor 7 and with an output module 28 for connection of the consumer 25. Furthermore, the control means 6 shown in FIG. 5 shows a processing module 29 between the input module 27 and the output module 28 which has corresponding logic for generating the evaluation signals. A corresponding processing module 29 is also present in the embodiment which is shown in FIG. 4, but is not illustrated.

In order to ensure the above described independence of the evaluation units 23, 24 from one another, it is provided, here in particular, that different storage areas of a microcontroller or the like are assigned to the input modules 27 of the two evaluation units 23, 24 in any case. The same applies to the output modules 28. In FIG. 5, registers (storages) 30 which are separate from one another are accordingly assigned to the input modules 27 and the output modules 28.

It should be pointed out that a maximum amount of independence between the two evaluation units 23, 24 can be achieved in that the two evaluation units 23, 24 are each implemented at least in part in separate hardware. In cases with especially high safety requirements, it may be feasible to accept the losses of flexibility with are basically associated therewith.

In the embodiment shown in FIG. 4, control signals for triggering the consumer 25 can be produced by means of the first evaluation unit 23 based on the sensor signals. The evaluation unit 23 as such can therefore be operated fundamentally as a conventional control. To ensure control engineering redundancy, by means of the second evaluation unit 24, based on the sensor signals, release signals can be produced, and the consumer 25 can only be triggered by the control signals of the first evaluation unit 23 when the second evaluation unit 24 produces a corresponding release signal. Therefore, on the one hand, the generation of control signals by the first evaluation unit 23 and the generation of a release signal by the second evaluation unit 24 are necessary for triggering the consumer 23 here.

The aforementioned control signals are produced by the first evaluation unit 23 only when the sensor 7 is "actuated" and the corresponding sensor signals are on the lines 11. The release signal is also produced by the second evaluation unit 24 only when the sensor 7 is "actuated."

The above described concept based on the generation of control signals, on the one hand, and release signals, on the other, largely preclude the unwanted triggering of the consumer 25 caused by a malfunction of the evaluation units 23, 24. If, for example, the first evaluation unit 23 incorrectly produces control signals without actuation of the sensor 7 having taken place, triggering of the consumer 25 still does not take place. The second evaluation unit 24 does not produce a release signal since it does not detect any actuation of the sensor 7.

The consumer 25 preferably has a driving motor 31 which is wired via a bridge circuit, the control means 6 for triggering the consumer 25 being coupled to the bridge circuit. The first evaluation unit 23 is coupled to the consumer 25 here in the manner of a conventional control. The second evaluation unit 24 is coupled to a switch which is connected to the current path which is decisive for activation of the consumer 25. This switch can be an individual field effect transistor or the like. In the embodiment shown in FIG. 4, this current path runs via the switches 32, 33 of the bridge circuit, to which the switch coupled to the second evaluation unit 24 is series connected.

The embodiment shown in FIG. 5 shows another structure of a redundant control means 6. Here, the two evaluation units 23, 24 are made essentially identical, and by means of the two evaluation units 23, 24, based on the sensor signals, control signals can be produced parallel to one another. Here, therefore, there are two evaluation units 23, 24 which each operate for themselves in the manner of a conventional control. In this redundant control means 6, the consumer 25 can only be triggered by the control signals when the two evaluation units 23, 24 produce identical control signals. For this purpose, the control means 6, preferably, has a logic module 34 which, preferably, has an AND gate between the control signals of the two evaluation units 23, 24. An AND gate in the aforementioned sensor switches through the control signals to the consumer 25 if the two evaluation units 23, 24 produce identical control signals. For the case in which the two evaluation units 23, 24 produce control signals which deviate from one another, therefore, triggering of the consumer 25 does not take place. Coupling between the logic module 34 and the consumer 25 is shown only schematically in FIG. 5 by an arrow.

Basically, it can also be provided that the two evaluation units 23, 24 are not made identically, for example, are programmed differently. Then, the task of the logic module 34 is to ascertain whether the control signals produced by the evaluation units 23, 24 are compatible with one another and which control signals are optionally to be delivered to the consumer 25.

In one especially preferred configuration, the control means 6 is equipped with a monitoring module 35 (FIG. 5) which is coupled to the two evaluation units 23, 24 and monitors them. Furthermore, it is preferably provided that the monitoring module 35 compares the respective operating states of the evaluation units 23, 24 to one another in order to detect error states which may occur. For example, with the monitoring module 35, it can also be detected whether one of the two evaluation units 23, 24 assumes an “unallowed” state. This can occur, for example, in the case of a cable break with the redundant connection of the sensor 7 which was addressed above.

It should be pointed out that, in certain applications, it can be advantageous to provide the control means 6 shown in FIG. 5 additionally with the above described evaluation unit which produces release signals. In this way, the operating reliability of the arrangement can be further increased. Furthermore, the aforementioned redundant control means 6 can be combined with the above described redundant design or linkage of the sensor 7 to maximize operating reliability.

In the above described illustrated examples, the sensor 7 or sensors 7 is/are used especially to detect the actuation for opening of the assigned motor vehicle lock 3. The consumer 25 here is made as the opening drive of the motor vehicle lock 3. However, alternatively or in addition, the sensor 7 can also be assigned to the motor vehicle 3 itself, especially can be located in it, for example, in order to detect the state of the motor vehicle lock 3.

The connection of the sensor 7 or sensors 7 in to the control means 6 accordance with the invention is not limited to the motor vehicle locking system 2, but can be used for more or less any sensors of the motor vehicle 1—for example, for an electric window raiser, for safety systems such as airbag systems or triggerable head supports or the like—especially when especially high failure safety is desired or necessary.

Finally, it should be pointed out that all the above described approaches can be applied especially to a motor vehicle locking system 2 of a motor vehicle 1.

What is claimed is:

1. Motor vehicle, comprising:

a control means; and at least one sensor which is electrically connected to the control means, wherein each sensor has two electrically independent and redundant outputs for transmission of redundant sensor signals, wherein the redundant outputs are connected to the control means via respective redundant electrical signal lines so as to provide alternative means for performing the same function of the sensor in different manners in case of failure of one of the redundant outputs, wherein the control means and the at least one sensor are part of a motor vehicle locking system of the motor vehicle, and wherein the at least one sensor, for producing the sensor signals, has at least two switching devices in parallel, at least one of the switching devices being made as a make contact switching device and another of the switching devices being made as a break contact switching device.

2. Motor vehicle as claimed in claim 1, wherein the at least one sensor is adapted for detecting one of a state of a motor vehicle lock and actuation of a control element of the motor vehicle.

3. Motor vehicle as claimed in claim 1, wherein the at least one sensor has exactly two electrically independent outputs for transmission of sensor signals.

4. Motor vehicle as claimed in claim 1, wherein the outputs of the sensor are connected to the control means via separate electrical signal lines.

5. Motor vehicle as claimed in claim 1, wherein the control means is adapted for delivering control signals to a consumer, and wherein the consumer is a drive of a motor vehicle lock.

6. Motor vehicle as claimed in claim 5, wherein the consumer is an opening drive of a motor vehicle lock.

7. Motor vehicle as claimed in claim 1, wherein the sensor signals at the different outputs of the at least one sensor are identical to one another, wherein the at least one sensor has two electrically independent outputs for the same sensor signal and the outputs are connected to two separate inputs of the control means via two separate electrical signal lines.

8. Motor vehicle as claimed in claim 7, wherein, when one signal line fails, the sensor signal is transmitted via the other signal line to the control means and evaluated by the control means.

9. Motor vehicle as claimed in claim 1, wherein, by the control means, a faulty sensor signal is detected by comparison of the sensor signals which have been transmitted over the signal lines.

10. Motor vehicle as claimed in claim 1, wherein the at least one sensor has at least two electrically independent inputs for the outputs and the inputs are connected to a power supply via separate supply lines.

11. Motor vehicle as claimed in claim 1, wherein the at least one sensor is a switching sensor.

12. Motor vehicle as claimed in claim 11, wherein the at least one sensor comprises a multi-circuit switch.

13. Motor vehicle as claimed in claim 11, wherein the sensor is a microswitch with two independent switching lugs.

14. Motor vehicle as claimed in claim 1, wherein the at least one sensor is at least one of a capacitive, inductive, optical and piezoelectric sensor.

15. Motor vehicle as claimed in claim 1, wherein each sensor signal is resistor-coded and is subject to voltage division so that at least one of a line interruption and a short circuit of a current path of the sensor signal is detectable by the control means.

16. Motor vehicle as claimed in claim 1, wherein said at least one sensor comprises at least first and second sensors, wherein each of the first and second sensors has two electrically independent and redundant outputs for sensor signals which are connected to two separate respective inputs of the control means via two respective signal lines.

17. Motor vehicle as claimed in claim 16, wherein the sensor signals of the sensors have at least one of different resistor-coding and different voltages so that the respective sensor signals can be detected independently of one another by the control means.

18. Motor vehicle as claimed in claim 1, wherein the motor vehicle has a motor vehicle locking system to which the control means and the at least one sensor is assigned.

19. Motor vehicle as claimed in claim 18, wherein the motor vehicle locking system has a motor vehicle lock to which the at least one sensor is assigned for detection of at least one of opening, unlocking and locking of the motor vehicle lock.

20. Motor vehicle as claimed in claim 18, wherein the motor vehicle locking system has a control element to which the at least one sensor is assigned for detection of actuation of the control element for at least one of opening, unlocking and locking of the motor vehicle lock.

21. Motor vehicle as claimed in claim 20, wherein that at least one sensor comprises two sensors, one of which is assigned to a control element which is actuatable from the interior of the motor vehicle and a second of which is assigned to a control element which is actuatable from outside of the motor vehicle.

22. Motor vehicle locking system of a motor vehicle, comprising:

at least one motor vehicle lock;

a control means; and at least one sensor which is electrically connected to the control means for detection of one of a state of the motor vehicle lock and actuation of a control element, wherein the sensor has at least two electrically independent and redundant outputs for transmission of redundant sensor signals, wherein the redundant outputs are connected to the control means via respective redundant electrical signal lines so as to provide alternative means for performing the same function of the sensor in different manners in case of failure of one of the redundant outputs, and wherein the sensor, for producing sensor signals, has at least two switching devices in parallel, at least one of the switching devices being a make contact switch and another of the switching devices being a break contact switch.

23. Motor vehicle locking system as claimed in claim 22, wherein the at least one sensor has two electrically independent outputs and the outputs are connected to two separate inputs of the control means via two separate electrical signal lines.

24. Motor vehicle locking system as claimed in claim 22, wherein the sensor, for producing sensor signals, has at least two switching devices in parallel, at least one of the switching devices being a make contact switch and another of the switching devices being a break contact switch.

25. Motor vehicle locking system as claimed in claim 22, wherein the sensor, for producing sensor signals, has at least two sensor modules and wherein the sensor modules each operate according to different sensor action principles.

26. Motor vehicle locking system as claimed in claim 22, wherein each sensor signal is resistor-coded and is subject to voltage division so that at least one a line interruption and a short circuit of a current path of the sensor signal is detectable by the control means.

27. Motor vehicle, comprising:

a control means and at least one sensor which is electrically connected to the control means, wherein each sensor has two electrically independent and redundant outputs for transmission of redundant sensor signals, and wherein the redundant outputs are connected to the control means via respective redundant electrical signal lines, wherein the control means and the at least one sensor are part of a motor vehicle locking system of the motor vehicle, and wherein the at least one sensor, for producing the sensor signals, has at least two sensor modules, and wherein the sensor modules each operate according to different sensor action principles so as to provide alternative means for performing the same function of the at least one sensor in different manners in case of failure of one of the redundant outputs.

28. Motor vehicle locking system of a motor vehicle, comprising:

at least one motor vehicle lock;

a control means; and at least one sensor which is electrically connected to the control means for detection of one of a state of the motor vehicle lock and actuation of a control element, wherein the sensor has at least two electrically independent and redundant outputs for transmission of redundant sensor signals, wherein the redundant outputs are connected to the control means via respective redundant electrical signal lines so as to provide alternative functional outputs in case of failure of one of the redundant outputs, and wherein the sensor, for producing sensor signals, has at least two sensor modules and wherein the sensor modules each operate according to different sensor action principles so as to provide alternative means for performing the same function of the at least one sensor in different manners in case of failure of one of the redundant outputs.

* * * * *